United States Patent [19]

Fergason

[11] 4,181,756
[45] Jan. 1, 1980

[54] PROCESS FOR INCREASING DISPLAY BRIGHTNESS OF LIQUID CRYSTAL DISPLAYS BY BLEACHING POLARIZERS USING SCREEN-PRINTING TECHNIQUES

[76] Inventor: James L. Fergason, 5806 Horning Rd., Kent, Ohio 44240

[21] Appl. No.: 839,672

[22] Filed: Oct. 5, 1977

[51] Int. Cl.² .............................................. G02F 1/13
[52] U.S. Cl. ...................................... 427/163; 8/107; 8/108 A; 350/337; 427/108
[58] Field of Search .................... 427/108, 163; 8/107, 8/108 A; 350/337

[56] References Cited

U.S. PATENT DOCUMENTS

| | | | |
|---|---|---|---|
| 3,731,986 | 5/1973 | Fergason | 350/337 X |
| 3,857,627 | 12/1974 | Harsch | 350/337 |
| 3,941,901 | 3/1976 | Harsch | 427/163 X |

*Primary Examiner*—James R. Hoffman
*Attorney, Agent, or Firm*—Thomas H. Murray

[57] ABSTRACT

Process and composition for selectively bleaching a polarizer, and particularly a polarizer used in a liquid crystal display, to achieve sharply-defined polarizing areas in accurate registration with the transparent conductive areas of the display. This is achieved by silk-screening a gel, containing a bleaching agent, onto selected areas of a polarizer in place of the display, the gel having a viscosity to permit silk-screening.

6 Claims, 1 Drawing Figure

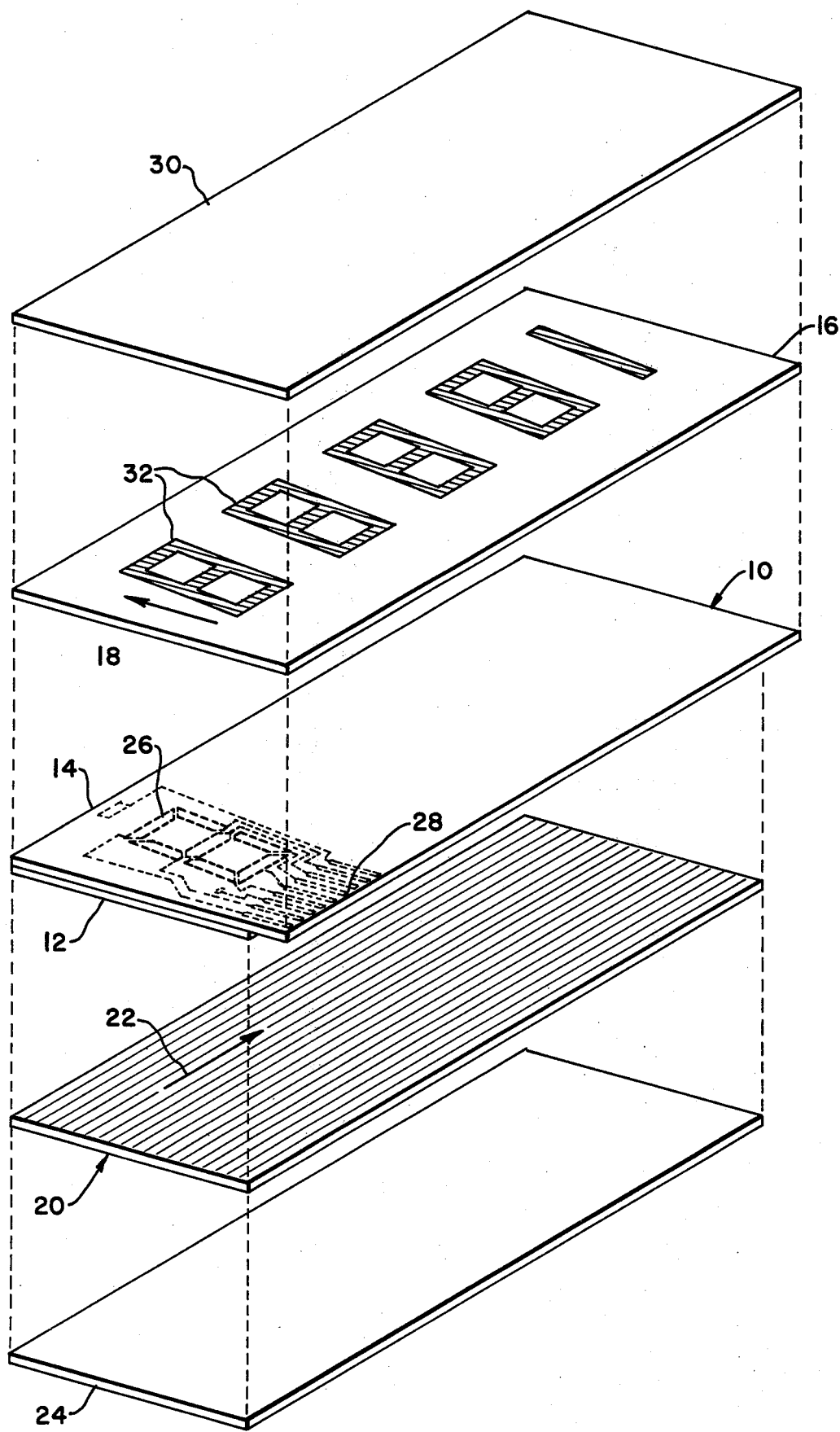

PROCESS FOR INCREASING DISPLAY BRIGHTNESS OF LIQUID CRYSTAL DISPLAYS BY BLEACHING POLARIZERS USING SCREEN-PRINTING TECHNIQUES

BACKGROUND OF THE INVENTION

As is known, liquid crystal alpha-numeric displays of the field-effect type comprise a layer of nematic liquid crystal material sandwiched between transparent parallel plates coated with transparent conductive films and which are rubbed on their surfaces in contact with the liquid crystal material to produce a twisted-nematic structure. On opposite sides of the liquid crystal layer are polarizers such that when an electrical potential is established between the transparent conductive films and across the liquid crystal layer, the device will change from a light-transmitting to opaque medium, or vice versa, depending upon the orientation of the two polarizers. By forming the conductive films on the front plate of the display in the shape of a desired optical image, that image can be made to appear or disappear, depending upon whether a potential is established between the conductive films. Furthermore, by creating separate conductive areas on the front plate, as by etching the conductive film thereon; any given number of conductive regions can be caused to appear opaque while other regions appear as a light background to produce any one of a number of different images or symbols (e.g., letters or numerals) with the same liquid crystal sandwich assembly.

In U.S. Pat. No. 3,857,627, issued Dec. 31, 1974, a liquid crystal display is described wherein the contrast between the digits or symbols of the display and the background of the display is materially improved by providing spaced strips of polarizing material covering only the spaced segments of the transparent conductive material on the front transparent plate of the liquid crystal cell which forms the symbols of an alpha-numeric display. Since the polarizing strips cover only the corresponding conductive segments on the front plate of the display, unpolarized light can pass through the front of the display in the areas not covered by the transparent conductive material and strips of polarizing material. As a result, much more light passes into the display; the background for the display appears much brighter, and much better contrast is achieved between the dark digits of the display and the lighter background.

One way in which polarizing strips can be formed to cover only the corresponding conductive segments on the front of the display is to bleach only those areas of the front polarizer (in the form a continuous sheet) which do not cover the transparent conductive electrodes. In the past, however, the problem has been to bleach a patterned polarizer which has sharply-defined edges and which can be accurately registered with the electrically-conductive films on the display. In this respect, registration of the polarizer becomes increasingly difficult with respect to the numerals of an alpha-numeric display as the polarizing pattern becomes closer and closer to the pattern of the digits on the display. Silk-screening techniques have been employed in the past; however the bleaching agent employed ordinarily is not viscous enough to form the required sharp transition between the polarized and unpolarized areas.

SUMMARY OF THE INVENTION

In accordance with the present invention, a method and composition are provided for bleaching a polarizer in place on an alpha-numeric display such that polarizing areas remain only over the transparent electrically-conductive portions of the display and are accurately registered therewith.

Specifically, there is provided a method for selectively bleaching sections of a planar polarizer comprising silk-screening onto selected areas of the polarizer a gel containing a substance which will bleach the polarizer dye, the gel having a consistency making it silk-screenable to form an accurate pattern with clearly-defined edges, and removing the gel after the dye has been bleached.

In the case of an alpha-numeric liquid crystal display, the unbleached polarizer is secured initially by means of a pressure-sensitive adhesive of optical quality to the front transparent plate of the display, the iodine-treated side of the polarizing film being opposite the front transparent plate and, therefore, exposed. The entire display is then placed on a silk-screen printer which is registered with respect to the original pattern of electrically-conductive transparent strips printed on the front transparent plate. The bleach is then printed directly onto the display through a silk screen, whereupon the display is rinsed with a mild acid solution such as 5% acetic acid in water. The result is a bleached pattern exactly in registration with the display.

The above and other objects and features of the invention will become apparent from the following detailed description taken in connection with the accompanying single FIGURE drawing which illustrates one embodiment of the invention.

With reference now to the drawing, there is shown an exploded view of a liquid crystal display, the liquid crystal unit itself being identified generally by the reference numeral 10. The liquid crystal unit includes a back transparent plate 12, a front transparent plate 14, and between the plates a layer of nematic liquid crystal material. As is more fully described in the aforesaid U.S. Pat. No. 3,857,627, the edges of the back and front transparent plates 12 and 14 are sealed to confine the layer of liquid crystal material therebetween. By rubbing the faces of the transparent plates in contact with the liquid crystal material at right angles to each other, the liquid crystal molecules can be made to assume a twisted-nematic structure such that polarized light passing through a polarizer 16 and polarized in the direction of rubbing on the front plate 14 (arrow 18) will be caused to rotate through 90° and can pass through a crossed, back polarizer 20 polarized in the direction of arrow 22. The light passing through polarizer 20 is then reflected from a reflector 24 and back through the polarizer 20, the display 10 and the front polarizer 16 such that the light background of the reflector 24 will appear. If, however, a suitable potential is applied across the liquid crystal film in the unit 10, the twisted-nematic structure will no longer exist; the polarized light will not pass through the unit 10; and the display, as viewed from the front, will appear opaque.

In order to form an alpha-numeric display, a transparent conductive film on the side of the front transparent plate 14 in contact with the liquid crystal is etched to form sets of mutually-insulated strips of transparent conductive material, only the first of said sets being shown in the drawing and identified by the reference numeral 26. It will be appreciated that when all of the strips of the set 26, for example, are opaque while the surrounding areas transmit light, the resulting configuration will represent the numeral 8. Similarly, by causing selected ones of the strips in set 26 to become opaque, any numeral from 1 through 0 can be made to appear.

The various mutually-insulated conductive strips in the set 26 are adapted to be connected through a plurality of mutually-insulated strips of transparent conductive material 28 to external leads, not shown. In this respect, it can be seen from the drawing that the lower end of the forward transparent plate 14 with the strips 28 thereon extends beneath the remainder of the liquid crystal unit 10 in order that a suitable electrical connector can be slipped over the lower portion of the plate 14 to connect the conducting strips 26 to external electrical circuitry, not shown. It will be appreciated of course, that in most liquid crystal displays, there is a plurality of such sets of conducting strips 26 which form adjacent numerals, although only one set is shown in the drawing for purposes of simplicity.

Above the front transparent plate 14 of the liquid crystal unit 10 is the polarizer 16, about to be described; and above the polarizer 16 is a sheet of anti-reflecting laminated glass 30. The polarizer 16 is provided on its undersurface with a film of transparent pressure-sensitive adhesive. The iodine-treated polarizing side of the polarizer is on the top of the sheet 16. That is to say, the polarizing side of the polarizer faces away from the liquid crystal unit 10.

In the fabrication of the liquid crystal unit 10, the entire underside of the front plate 14 is covered with transparent conductive material, such as indium oxide. A photoresist ink is silk-screened onto the electrically-conductive material and processed to cover only the sets of electrically-conductive strips, such as set 26, and the conducting strips 28. Thereafter, the surface is etched by a suitable etching agent to remove all of the transparent conductive material other than that forming the sets 26 and the conducting strips 28. Finally, the photoresist ink is removed. In the silk-screening process, the plate 14 is registered with respect to the silk screen with three point pins as is conventional.

Thereafter, the unit 10 is assembled with the layer of liquid crystal material between the front transparent plate 14 and the back transparent plate 12 which has patches of electrically-conductive material behind the sets of conductive strips 26. The rear polarizer 20 and the front polarizer 16 are then applied with the front polarizer 16 having its dichroic iodine-treated side facing outwardly from the unit 10. Thus, as initially applied to the unit, the entire front surface of the polarizing sheet is iodine-treated.

In order to bleach the polarizer 16 so as to remove the polarizing material at all areas except those overlying the sets of conductive strips 26 to form patterns identified by the reference numeral 32, the unit 10 with the polarizers 16 and 20 applied is subjected to a second silk-screening process wherein the unit is precisely registered with respect to the original patterns of the sets of conducting strips 26 by means of three point pins which contact the plate 14 at exactly the same points which were used for silk-screening the photoresist on the underside of the plate 14. In the silk-screening step, a basic solution by itself will not be viscous enough to be printed through a silk screen. Accordingly, the alkali bleaching agent is mixed with a gelatin such that the resulting mixture is viscous enough to become screen-printable to form a pattern which can be accurately formed and registered with precisely-defined edges.

A suitable material for use in the silk-screening process for selectively bleaching a polyvinyl alcohol iodine-based polarizer is sodium hydroxide, potassium hydroxide or any other strong base gelled with methylcarboxycellulose. The thickening or gelling process gives a material which is ideally suited to silk-screen printing. The bleaching gel is printed directly onto the display; and thereafter the display is rinsed with a mild acid solution such as 5% acetic acid in water. Other gels which can be used to form a screen-printable bleaching agent for iodine-based polarizers are AN-poly(methylvinyl ether/meleic anhydride) and carboxypolymethylene polymers. A similar process can be adapted for use on polarizers made from polyunsaturated dienes sold by Polaroid Corporation under the trade name KN 42. In this latter process, a chlorinating agent such as sodium hypochlorite is mixed with a gel and silk-screened directly onto the polarizer, the chlorinating agent acting to saturate the double-bonds which are involved in the polarization process.

As an example of a gel which can be successfully used in the practice of the invention, 2 liters of distilled water and 24 milliliters of polyethylene glycol, which acts as a wetting agent, are initially mixed. The mixture is stirred well, and about 252 milliliters of a 40% sodium hydroxide solution is then added slowly with stirring. When the solution is thoroughly mixed, up to 100 grams and preferably about 70 grams of sodium carboxymethylcellulose is added using a Cowles dissolver at a low shear setting. If desired, a small amount of borax, on the order of about 2 grams, may be added with the sodium carboxymethylcellulose. After all of the materials have been added, the amount of shear is increased and the material mixed until thoroughly homogeneous. After the bubbles in the gel dissipate, the clear material can then be bottled in polyethylene containers for use in the silk-screening process.

It is essential that the gel containing the alkali have a pH exceeding 8.5; and preferably it will have a pH in the range of about 8.5 to 9 to achieve efficient bleaching of the polarizer. The viscosity of the bleach can be varied by varying the amount of sodium carboxymethylcellulose or other gel depending upon requirements.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method for selectively bleaching sections of a planar polarizer comprising silk-screening onto selected areas of the polarizer a gel containing a substance which will bleach the polarizer dye, the gel having a consistency making it silk-screenable to form an accurate pattern with clearly-defined edges, and removing the gel after the dye has been bleached.

2. The method of claim 1 wherein said gel contains a gelatinous material selected from the group consisting of methylcarboxycellulose, AN-poly(methylvinyl ether/maleic anhydride), and carboxypolymethylene polymers.

3. The method of claim 2 wherein said polarizer is a polyvinyl alcohol iodine-based polarizer and said gel contains an alkali solution selected from the group consisting of potassium hydroxide and sodium hydroxide.

4. The method of claim 1 wherein said polarizer incorporates unsaturated dienes and said gel contains a chlorinating agent which will saturate the double-bonds of the dienes involved in the polarization process.

5. The method of claim 4 wherein said chlorinating agent comprises sodium hypochlorite.

6. The method of claim 1 wherein said planar polarizer is secured to the front transparent plate of a liquid crystal alpha-numeric display, the selected areas of the polarizer which are covered by the gel to bleach the same being those areas other than the areas of the polarizer registering with transparent conductive strips on the underside of the front transparent plate of the liquid crystal display, and including the step of registering the liquid crystal display exactly as it was registered in the formation of the transparent conductive strips prior to silk-screening.

* * * * *